US012665144B2

(12) United States Patent (10) Patent No.: US 12,665,144 B2
Zhang (45) Date of Patent: Jun. 23, 2026

(54) FOOT-OPERATED CONTROL SWITCH AND SPACE HEATER

(71) Applicant: LIVYI LLC, Los Angeles, CA (US)

(72) Inventor: Yi Zhang, Xiamen (CN)

(73) Assignee: LIVYI LLC, Los Angeles, CA (US)

( * ) Notice: Subject to any disclaimer, the term of this patent is extended or adjusted under 35 U.S.C. 154(b) by 0 days.

(21) Appl. No.: 19/071,771

(22) Filed: Mar. 6, 2025

(65) Prior Publication Data

US 2026/0074127 A1     Mar. 12, 2026

(30) Foreign Application Priority Data

Sep. 9, 2024    (CN) .......................... 202422206169.4

(51) Int. Cl.
| | |
|---|---|
| *H01H 13/16* | (2006.01) |
| *F24H 9/20* | (2022.01) |
| *H01H 13/10* | (2006.01) |
| *H01H 13/70* | (2006.01) |
| *H05B 1/02* | (2006.01) |
| *G01K 1/02* | (2021.01) |

(52) U.S. Cl.
CPC ........... *H01H 13/16* (2013.01); *F24H 9/2071* (2013.01); *H01H 13/10* (2013.01); *H01H 13/70* (2013.01); *H05B 1/0275* (2013.01); *G01K 1/02* (2013.01); *H01H 2217/004* (2013.01)

(58) Field of Classification Search
CPC ........ H01H 13/16; H01H 13/10; H01H 13/70; H01H 2217/004; F24H 9/2071; F24H 9/20; H05B 1/0275; H05B 1/02; G01K 1/02
USPC ........................................................ 200/86.5
See application file for complete search history.

(56) References Cited

U.S. PATENT DOCUMENTS

| | | | | | |
|---|---|---|---|---|---|
| 5,386,084 | A | * | 1/1995 | Risko ..................... | H05K 5/068 |
| | | | | | 277/921 |
| 2008/0264768 | A1 | * | 10/2008 | Shi .......................... | H01H 15/10 |
| | | | | | 200/344 |
| 2013/0048482 | A1 | * | 2/2013 | Saitou ..................... | E05B 81/76 |
| | | | | | 200/341 |

* cited by examiner

*Primary Examiner* — Lheiren Mae A Caroc

(74) *Attorney, Agent, or Firm* — Jose Cherson Weissbrot

(57) ABSTRACT

A foot-operated control switch includes a mounting base, a main control circuit board, a first button switch and a display screen. The mounting base includes a top cover; the main control circuit board is provided in the mounting base and configured for electrical connection with a controlled device; the first button switch is electrically connected to the main control circuit board and configured to control at least one or a combination of turn-on, turn-off, temperature, wind speed, timing and power of the controlled device; and the display screen is arranged on the top of the mounting base, and is electrically connected to the main control circuit board. The foot-operated control switch is used in a space heater.

8 Claims, 8 Drawing Sheets

FOOT-OPERATED CONTROL SWITCH AND SPACE HEATER

TECHNICAL FIELD

The present disclosure relates to the technical field of control switches, and in particular to a foot-operated control switch and a space heater.

BACKGROUND ART

A foot-operated control switch, which is also known as a pedal switch, is a control device operated by stepping or pedaling. It mainly functions to replace a two-handed operation to achieve the purpose of operation in a control circuit to which two hands are not accessible.

SUMMARY

An embodiment of the present disclosure provides a foot-operated control switch, including:

a mounting base including a top cover;

a main control circuit board provided in the mounting base, the main control circuit board being configured for electrical connection with a controlled device;

a first button switch electrically connected to the main control circuit board, the first button switch being provided on the mounting base and configured to control at least one or a combination of turn-on, turn-off, temperature, wind speed, timing and power of the controlled device; and a display screen provided on the mounting base, the display screen being electrically connected to the main control circuit board and configured to display an operating state of the controlled device, and the main control circuit board, the first button switch and the display screen being all arranged on the top cover.

An embodiment of the present disclosure provides a space heater, including a foot-operated control switch;

the foot-operated control switch including:

a mounting base including a top cover;

a main control circuit board provided in the mounting base, the main control circuit board being configured for electrical connection with the space heater;

a first button switch electrically connected to the main control circuit board, the first button switch being provided on the mounting base and configured to control at least one or a combination of turn-on, turn-off, temperature, wind speed, timing and power of the space heater; and a display screen provided on the mounting base, the display screen being electrically connected to the main control circuit board and configured to display an operating state of the space heater, and the main control circuit board, the first button switch and the display screen being all arranged on the top cover.

BRIEF DESCRIPTION OF THE DRAWINGS

In accompanying drawings, the same reference signs denote the same or similar components or elements throughout multiple drawings unless otherwise specified. These drawings are not necessarily drawn to scale. It should be understood that these drawings depict only some embodiments disclosed in the present disclosure and should not be construed as limiting the scope of the present disclosure.

REFERENCE NUMERALS

1. Mounting base; 11. Mounting body; 111. Bottom seat; 1111. First connecting hole; 1112. Engagement protrusion; 1113. Positioning protrusion; 112. Top cover; 1121. Clearance hole; 1122. Engagement groove; 1123. Positioning groove; 12. Connecting plate; 121. Second connecting hole; 13. Clearance gap; 14. Fastener; 2. Main control circuit board; 3. First button switch; 31. Button protective cover; 311. Anti-slip protrusion; 32. Button base; 4. Display screen; 5. Second button switch; 6. Temperature sensor; 7. Controlled device.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present disclosure. Therefore, the accompanying drawings and the description are considered as exemplary in nature rather than limiting.

Figure 1:
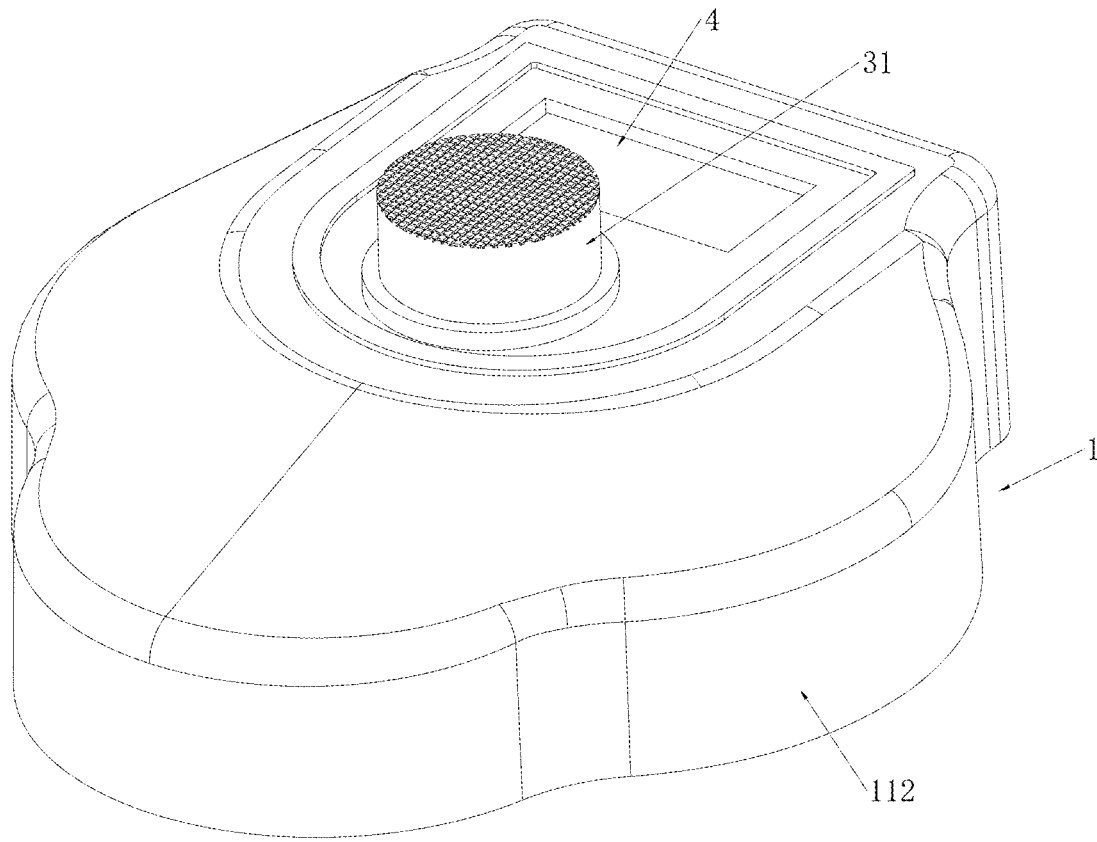
FIG. 1 is a perspective schematic structural diagram of a foot-operated control switch according to a first embodiment of the present disclosure.
Figure 11:
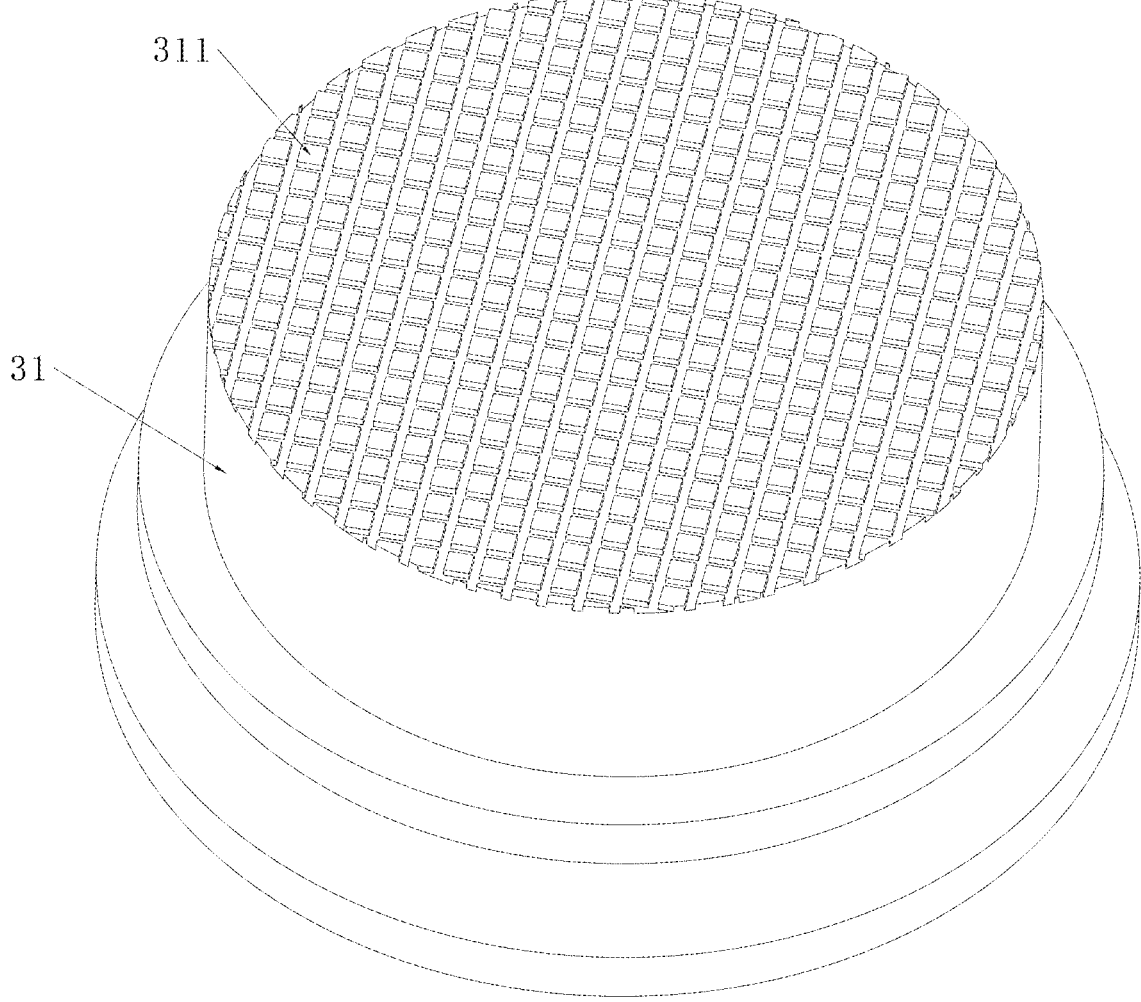
FIG. 11 is a perspective schematic structural diagram of a button protective cover of the present disclosure.

Referring to FIGS. 1 and 11, a foot-operated control switch according to an embodiment of the present disclosure is shown. The foot-operated control switch includes:

a mounting base 1 including a mounting body 11;

a main control circuit board 2 provided in the mounting base 1, the main control circuit board 2 being configured for electrical connection with a controlled device 7;

a first button switch 3 electrically connected to the main control circuit board 2, a first press portion of the first button switch 3 being exposed from the mounting base 1, and the first button switch 3 being configured to control at least one or a combination of turn-on, turn-off, temperature, wind speed, timing and power of the controlled device 7, where the first button switch 3 may be arranged at the top, a side or the bottom of the mounting base 1, which is not strictly limited herein; and a display screen 4 provided on the top of the mounting base 1, the display screen 4 being electrically connected to the main control circuit board 2, and the display screen 4 being configured to display an operating state of the controlled device 7. The main control circuit board 2, the first button switch 3 and the display screen 4 are all arranged on the mounting body 11.

According to the foot-operated control switch of the present disclosure, the first button switch 3 can be pressed down by stepping on the first press portion of the first button switch 3, and the first button switch 3 can be reset by releasing the first button switch 3, to enable a circuit to be closed or opened so as to control the operation of the controlled device 7, for example, at least one or a combination of the turn-on, the turn-off, the temperature, the wind speed, the timing and the power of the controlled device 7 can be controlled, such that the foot-operated control switch has a foot-operated control function. In addition, since the display screen 4 is provided on the top of the mounting base 1, the display screen 4 can be electrically connected to the main control circuit board 2, and the display screen 4 can display the operating state of the controlled device 7, for example, a turn-on state, a turn-off state, the temperature, the wind speed, a timing state and power of the controlled device 7 can be displayed, to visualize the operating state of the controlled device 7, such that the foot-operated control switch has a display function, and the use ratio of the foot-operated control switch is improved. It can be understood that the foot-operated control switch may be manually pressed for adjustment.

Figure 4:
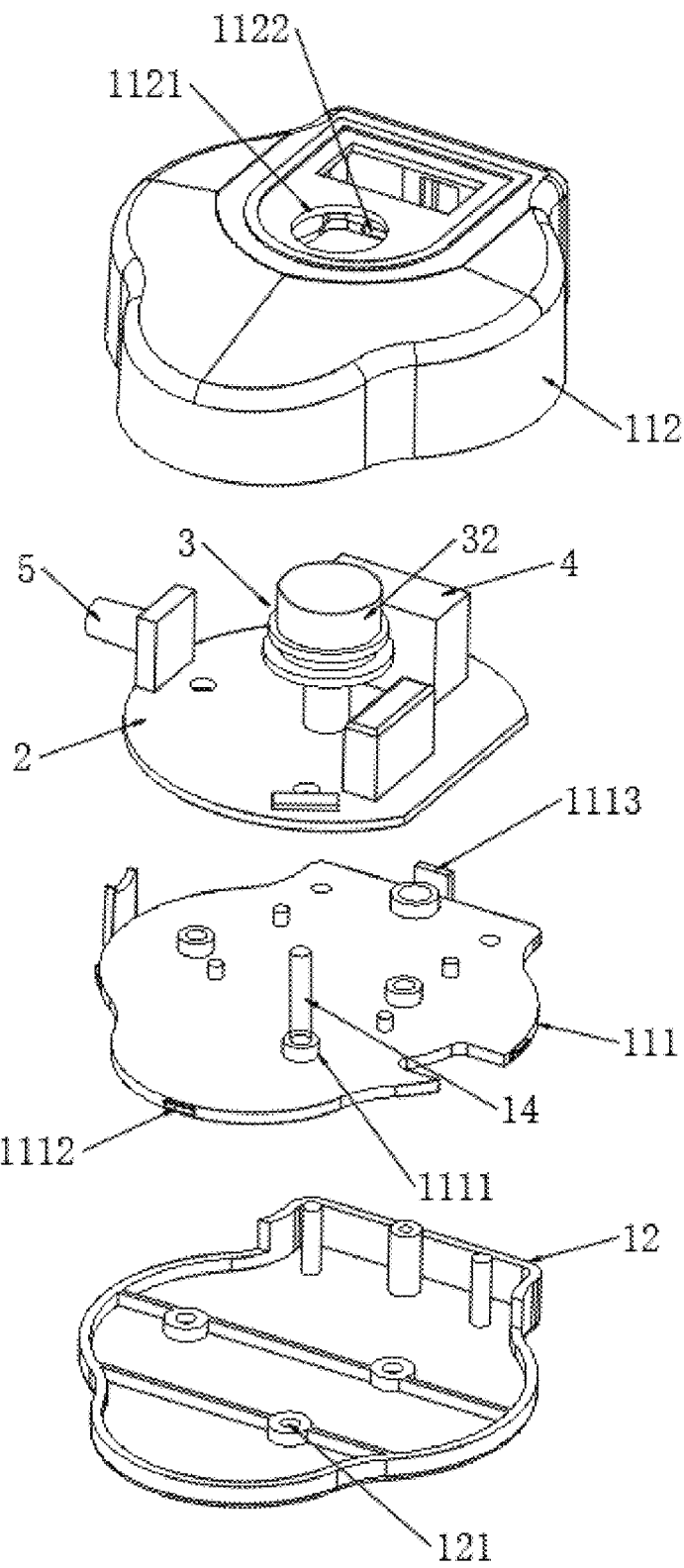
FIG. 4 is an exploded view of the foot-operated control switch according to the second embodiment of the present disclosure.
Figure 5:
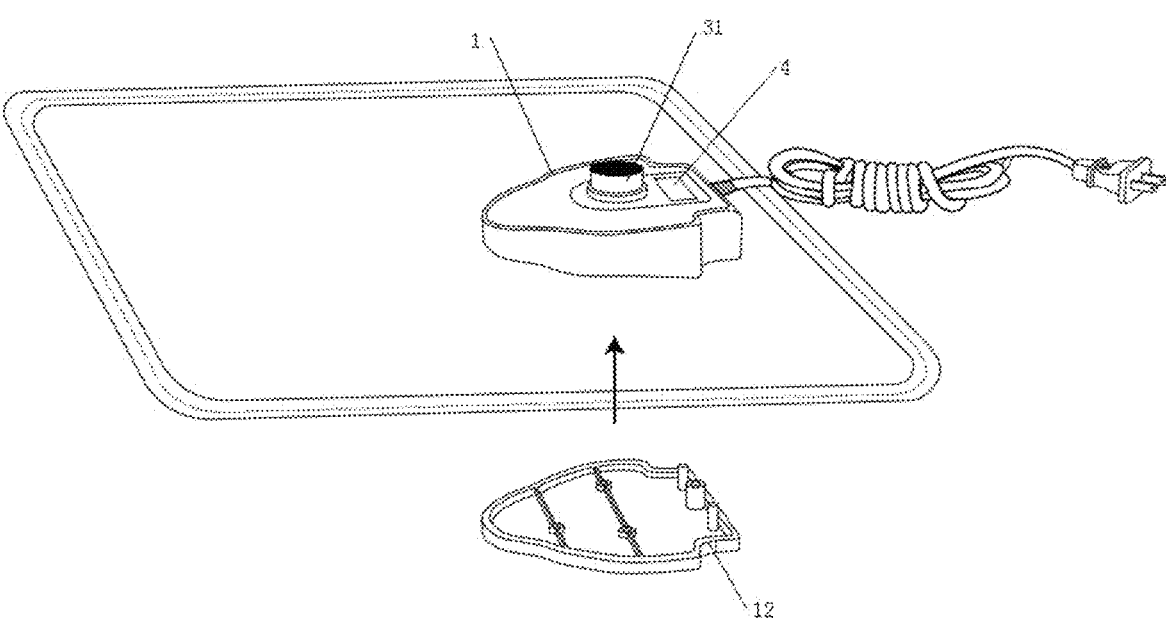
FIG. 5 is a schematic structural diagram of the foot-operated control switch, when mounted on a controlled device, according to the second embodiment of the present disclosure.

Referring to FIG. 4, in some embodiments, the foot-operated control switch further includes:

a second button switch 5 electrically connected to the main control circuit board 2, the second button switch 5 being arranged at the top, the side or the bottom of the mounting base 1, which is not strictly limited herein. A second press portion of the second button switch 5 is exposed from the top, the side or the bottom of the mounting base 1, and the second button switch 5 is configured to control the operation of the controlled device 7. In this way, the second button switch 5 can be operated to control at least one or a combination of the turn-on, the turn-off, the temperature, the wind speed, the timing and the power of the controlled device 7, or to control different functions of the controlled device 7, for example, the first button switch 3 is configured to control the turn-on and turn-off of the controlled device 7, and the second button switch 5 may be configured to control the temperature, the wind speed and the like of the controlled device 7, such that the foot-operated control switch can have diversified functions, the use ratio of the foot-operated control switch can further be improved, and the use requirements of different users can also be met.

In some embodiments, a plurality of second button switches 5 may be provided, and the plurality of second button switches 5 are respectively configured to control the adjustment of the different functions of the controlled device 7 so as to achieve functional diversification, and also further improve the use ratio of the foot-operated control switch.

It can be understood that the first button switch 3 and the second button switch 5, which are also known as control buttons (simply, buttons), are low-voltage electrical devices that can be controlled by means of stepping and generally can reset automatically, and the button switches are typically used in a circuit to send a start or stop command in order to control the close (i.e., electrical connection) and open (i.e., electrical disconnection) of a coil current of an electrical device such as an electromagnetic starter, a contactor, or a relay.

Referring to FIGS. 2-11, in some embodiments, the first button switch 3 includes:

a button base 32, which is movably arranged and is exposed from the mounting base 1, the first press portion being arranged on the button base 32; and a button protective cover 31, which is sleeved on the button base 32 and has a structure made of a silicone or rubber material. Since the button protective cover 31 has the structure made of the silicone or rubber material, the button protective cover 31 has a certain elasticity and flexibility and can provide a certain buffering effect, such that the button base 32 is less likely to be damaged by stepping, the button protective cover 31 is also durable and wear-resistant, and thus the service life of the first button switch 3 can be prolonged.

Referring to FIG. 11, in some embodiments, a plurality of anti-slip protrusions 311 are provided on the top of the button protective cover 31, and the plurality of anti-slip protrusions 311 are arranged at intervals. Thus, when the first button switch 3 is stepped, the anti-slip protrusions 311 come into contact with the foot to increase a frictional force between the protrusions and the foot, limiting the slip of the foot relative to the first button switch 3 and providing an anti-slip effect, thus ensuring that the first button switch 3 can be pressed.

Referring to FIG. 11, in some embodiments, a top surface of each of the anti-slip protrusions 311 is a planar surface, i.e., a surface of the anti-slip protrusion 311 in contact with the human foot is a planar surface, increasing the area of contact between the anti-slip protrusion 311 and the human foot, thereby providing a good anti-slip effect.

In other embodiments, the top surface of the anti-slip protrusion 311 may be a convex arc surface.

In some embodiments, a connecting groove (not shown) is provided in the button protective cover 31, and the connecting groove is arranged around an outer circumferential surface of the button base 32; and a connecting protrusion (not shown) is provided on the outer circumferential surface of the button base 32, the connecting protrusion is adapted to the connecting groove to limit the button protective cover 31 from disengaging upwards from the button base 32, that is, to prevent the button protective cover 31 from falling off and to ensure that the button protective cover 31 can be reliably sleeved on the button base 32, thereby providing a protective effect for the button base 32.

In some embodiments, the mounting base 1 includes:

a mounting body 11, where a main control circuit board 2, a first button switch 3 and a display screen 4 are all arranged on the mounting body 11, and the mounting body 11 has a first connecting hole 1111 at the bottom;

a connecting plate 12, where the connecting plate 12 is located below the bottom of the mounting body 11, a clearance gap 13 is formed between the connecting plate 12 and the mounting body 11, the clearance gap 13 is configured to be adapted to a controlled device 7, and the connecting plate 12 has a second connecting hole 121; and a fastener 14, where a head portion of the fastener 14 abuts against the bottom of the connecting plate 12, a rod portion of the fastener 14 penetrates the second connecting hole 121, the controlled device 7 and the first connecting hole 1111 sequentially, and the rod portion of the fastener 14 is in threaded connection with the first connecting hole 1111. In this way, the controlled device 7 can be located in the clearance gap 13, and the fastener 14 is then used to connect the connecting plate 12, the controlled device and the mounting body 11 so as to clamp a connection portion between the connecting plate 12 and the mounting body 11, such that the mounting base 1 is fixed to the controlled device, that is, the foot-operated control switch is fixed to the controlled device. The fastener 14 is a screw or a stud.

In other embodiments, the foot-operated control switch may be placed directly on the ground.

Figure 2:
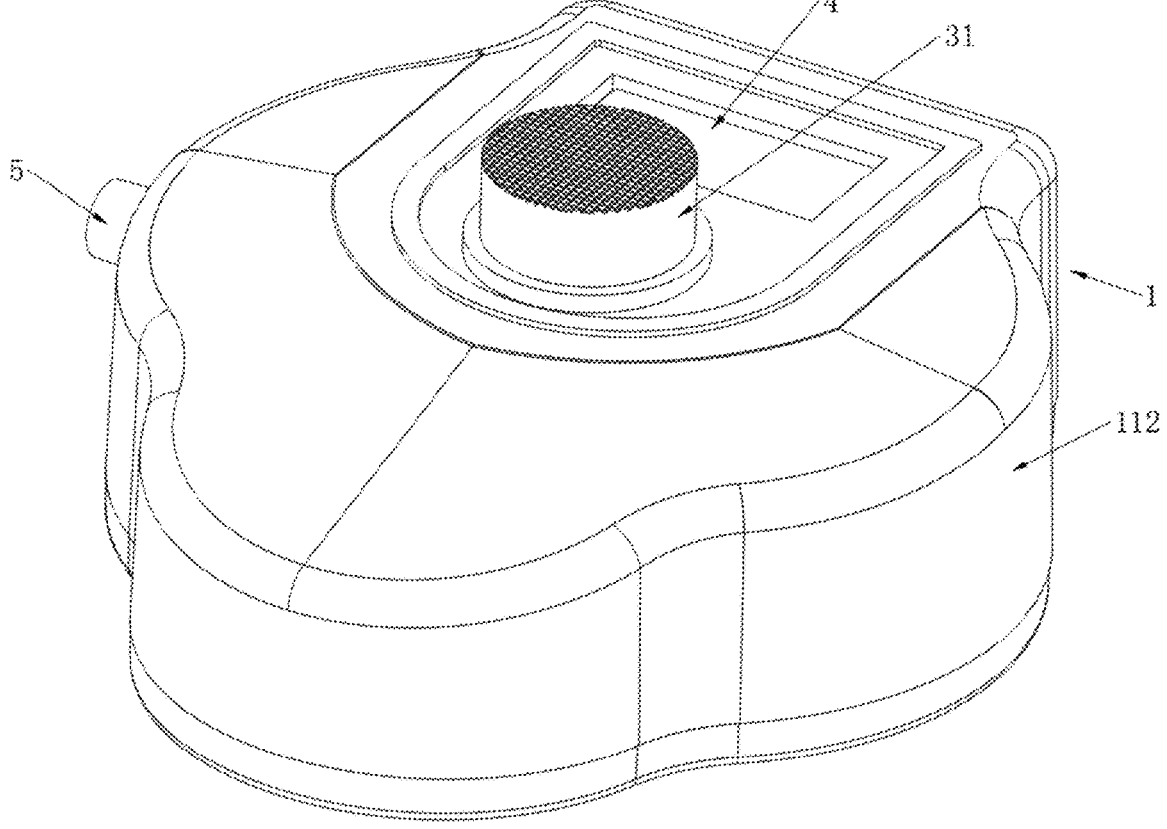
FIG. 2 is a perspective schematic structural diagram of a foot-operated control switch according to a second embodiment of the present disclosure from a first perspective.
Figure 3:
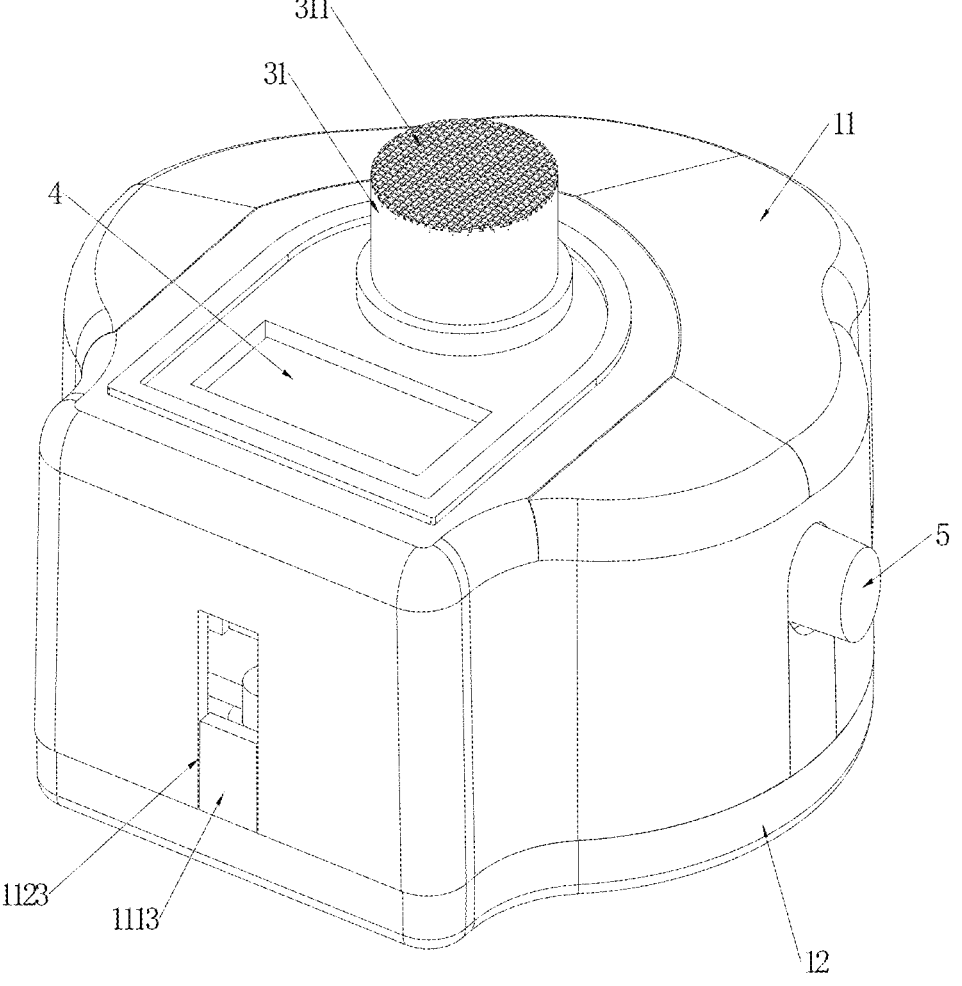
FIG. 3 is a perspective schematic structural diagram of the foot-operated control switch according to the second embodiment of the present disclosure from a second perspective.

Referring to FIGS. 2-4, in some embodiments, the mounting body 11 includes:

a bottom seat 111, the main control circuit board 2 being arranged on a top surface of the bottom seat 111; and a top cover 112, the top cover 112 covering the bottom seat 111, the top cover 112 and the bottom seat 111 forming an accommodating cavity for accommodating the main control circuit board 2 and at least part of the first button switch 3, the top cover 112 having a clearance hole 1121 at the top, and the first press portion penetrating the clearance hole 1121. Thus, during mounting, the main control circuit board 2 is first mounted on the top surface of the bottom seat 111, and then the top cover 112 covers the bottom seat 111 to complete the mounting, which makes the mounting operation simple and easy, and provides a high mounting efficiency.

Referring to FIG. 4, in some embodiments, an engagement groove 1122 is provided on one of the bottom seat 111 and the top cover 112, an engagement protrusion 1112 is provided on the other thereof, and the engagement protrusion 1112 fits with the engagement groove 1122 to connect the bottom seat 111 and the top cover 112 together, that is, the bottom seat 111 and the top cover 112 are connected together in an engaging manner, such as a screw-free connection manner without an auxiliary tool in the mounting process, which facilitates the bottom seat 111 and the top cover 112 being quickly mounted together, making the mounting operation easier, and contributing to the further improvement of the mounting efficiency.

Referring to FIG. 4, in some embodiments, a plurality of engagement grooves 1122 and a plurality of engagement protrusions 1112 are provided, the plurality of engagement grooves 1122 and the plurality of engagement protrusions 1112 are each arranged at intervals around the connection between the bottom seat 111 and the top cover 112, and each of the engagement protrusions 1112 is adapted to a corresponding one of the engagement grooves 1122 to reliably fix the bottom seat 111 and the top cover 112 together.

In other embodiments, the bottom seat 111 and the top cover 112 may also be connected together by means of a fastener, where the fastener may specifically be at least one or a combination of a screw, a bolt, a rivet, etc.

Referring to FIGS. 3-4, in some embodiments, a positioning groove 1123 is provided on one of the bottom seat 111 and the top cover 112, a positioning protrusion 1113 is provided on the other thereof, and the positioning protrusion 1113 fits with the positioning groove 1123 to provide an effect of positioning for mounting, thereby facilitating the further improvement of the mounting efficiency of the bottom seat 111 and the top cover 112.

Figure 10:
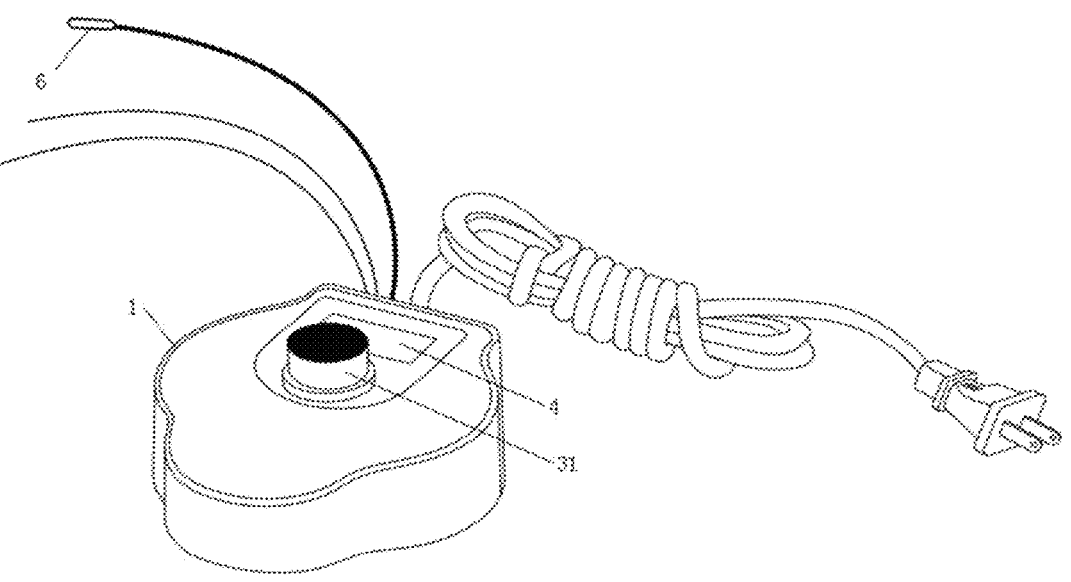
FIG. 10 is a schematic structural diagram of a foot-operated control switch according to a fourth embodiment of the present disclosure.

Referring to FIG. 10, in some embodiments, the foot-operated control switch further includes:

a temperature sensor 6, the temperature sensor 6 being electrically connected to the main control circuit board 2, the temperature sensor 6 being located outside the mounting base 1, and the temperature sensor 6 being configured to measure an ambient temperature of the controlled device 7.

The main control circuit board 2 is further configured to control the display screen 4 to display the ambient temperature of the controlled device 7 based on first feedback information of the temperature sensor 6, in order to visualize the real-time ambient temperature of the controlled device 7, and the main control circuit board 2 is further configured to control the controlled device 7 to be turned off based on second feedback information of the temperature sensor 6, that is, after the temperature sensor 6 detects that the ambient temperature of the controlled device 7 reaches a set temperature, the main control circuit board 2 controls the controlled device 7 to be turned off to stop current output, and thus the controlled device 7 stops operating, such that the use safety of the controlled device 7 can also be improved while the temperature can be precisely controlled.

In some embodiments, the temperature sensor 6 is an NTC temperature sensor 6, i.e., a heat-sensitive temperature sensor 6, and can precisely control a temperature.

Figure 6:
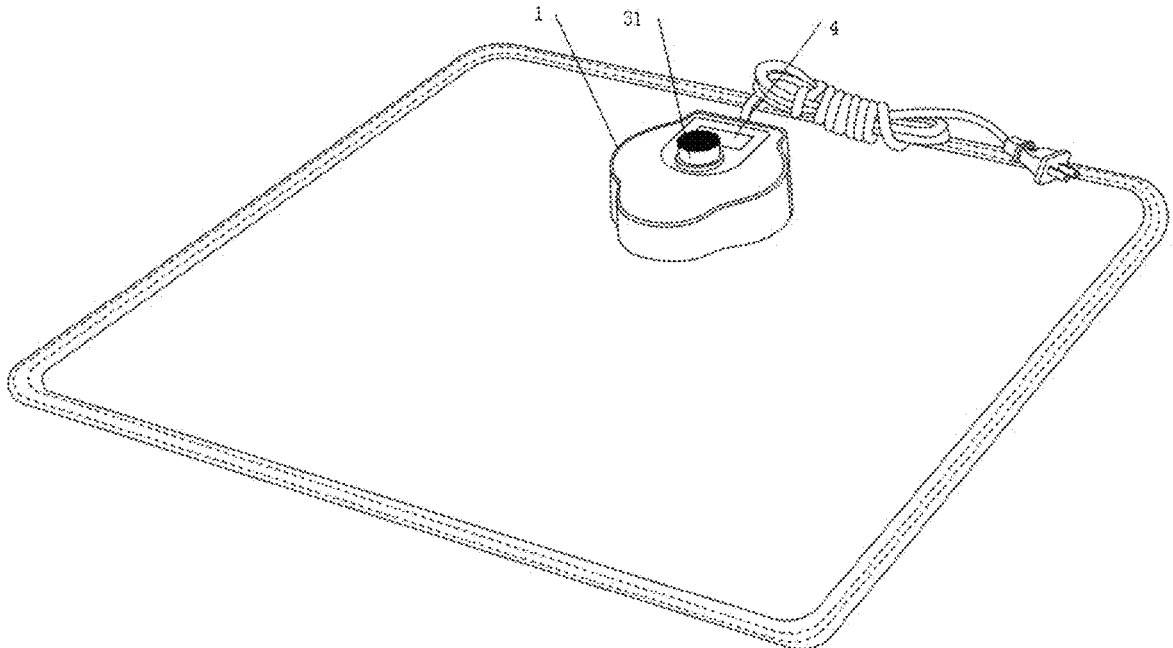
FIG. 6 is a schematic structural diagram of the foot-operated control switch, when mounted on the controlled device, according to the second embodiment of the present disclosure.
Figure 7:
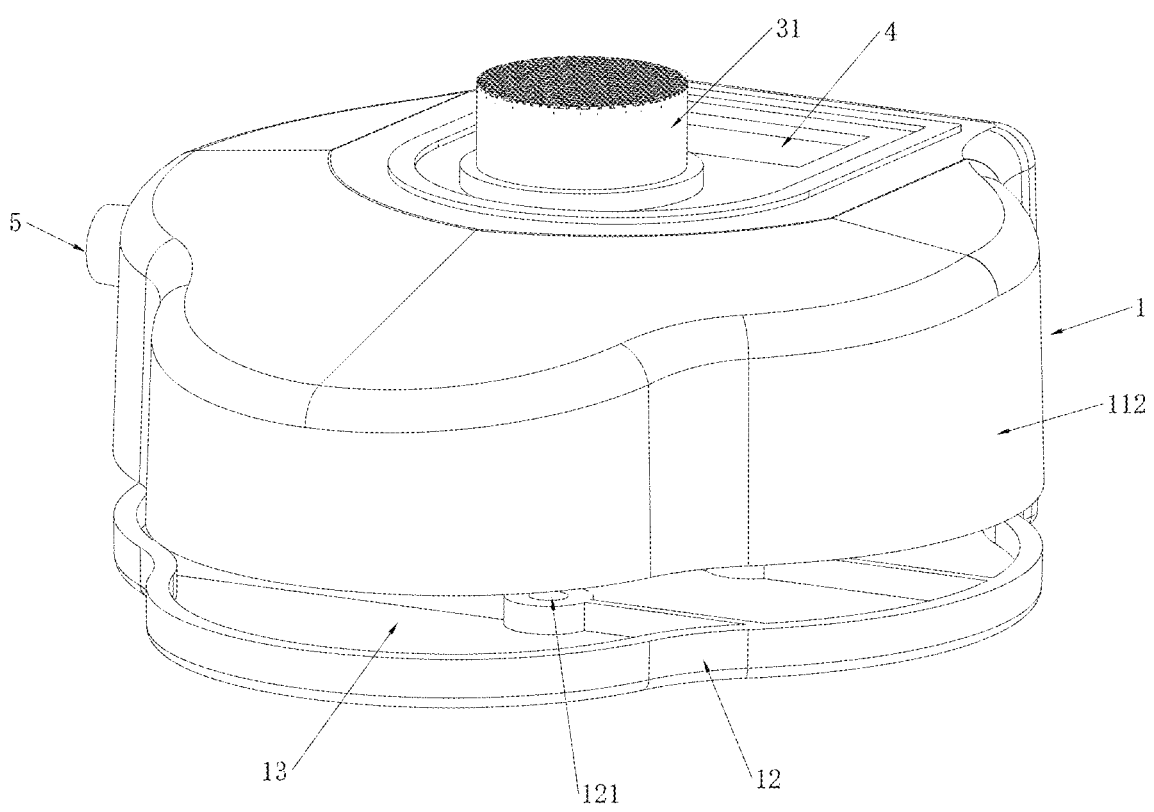
FIG. 7 is a perspective schematic structural diagram of a foot-operated control switch according to a third embodiment of the present disclosure from a first perspective.
Figure 8:
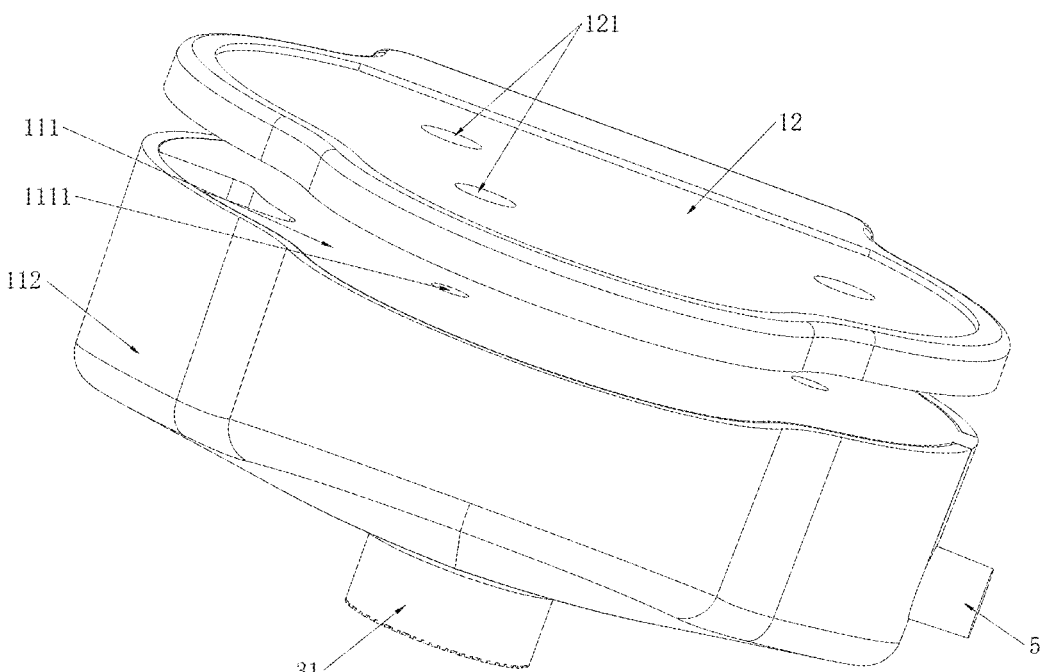
FIG. 8 is a perspective schematic structural diagram of the foot-operated control switch according to the third embodiment of the present disclosure from a second perspective.
Figure 9:
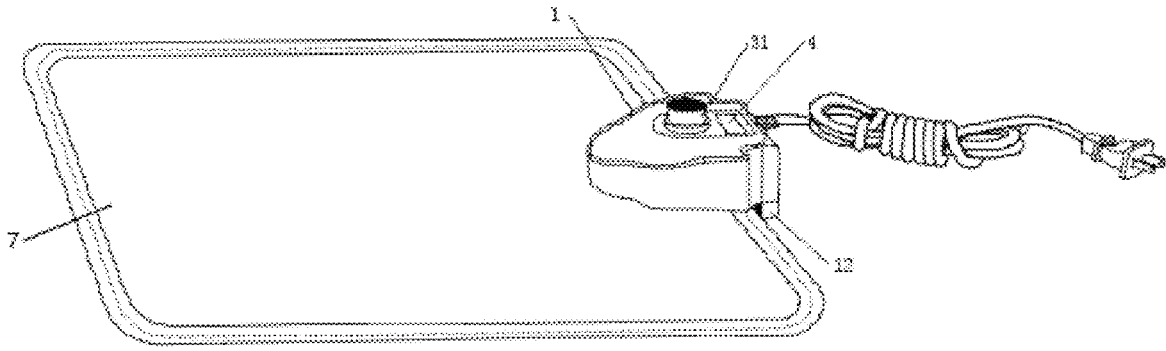
FIG. 9 is a schematic structural diagram of the foot-operated control switch mounted on the controlled device according to the third embodiment of the present disclosure.

Methods for fixing the foot-operated control switch are as follows: the foot-operated control switch is not fixed to the controlled device 7, that is, the foot-operated control switch is connected to the controlled device 7 by means of a switch wire, which is suitable for a relatively three-dimensional controlled device 7;

no connecting plate 12 is provided, and the foot-operated control switch is fixed to a surface of the controlled device 7 by means of a screw or an adhesive; and the connecting plate 12 is provided, and the foot-operated control switch is fixed to the controlled device 7 by sandwiching the controlled device 7 between the bottom seat 111 and the connecting plate 12 (as shown in FIGS. 6 and 9), which is suitable for a relatively flat controlled device 7. If the connecting plate 12 is provided, referring to FIGS. 7-9, one side of the connecting plate 12 protrudes, this protrusion is connected to the bottom seat 111, the connecting plate 12 and the bottom seat 111 define the clearance gap 13 to allow the controlled device 7 to be clamped on a side edge thereof, and the side edge of the controlled device 7 is not exposed due to the side protrusion of the connecting plate 12, achieving an aesthetic appearance (see FIG. 9); and referring to FIGS. 2-6, no side protrusion is provided on one side of the connecting plate 12 to allow the controlled device 7 to be clamped at any position close to the center (see FIG. 6).

The foot-operated control switch may be powered by means of a power cord or may also be a control switch with a dry battery or a lithium battery mounted therein.

An embodiment of the present disclosure provides a space heater, i.e., one of the controlled devices 7 described above, the space heater including the foot-operated control switch described above.

By using the above-described foot-operated control switch, the space heater of the present disclosure similarly has the functions of the foot-operated control switch and a display function, and the use ratio of the foot-operated control switch is improved.

Specifically, the space heater may be a large space heater such as an industrial warm air blower, a hot air dryer, a hot air drying machine, an electric heating blower, a workshop warmer, a workshop warmer, an oil paint air dryer, a motor-based paint-spraying dryer, or a floor drying machine, and may also be a household appliance such as a warmer or a foot warmer.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present disclosure, the meaning of "a plurality of" is two or more, unless explicitly and specifically defined otherwise.

The above descriptions are merely specific embodiments of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

What is claimed is:

1. A foot-operated control switch, comprising:
a mounting base comprising a top cover and a bottom seat, a main control circuit board being arranged on a top surface of the bottom seat and configured for electrical connection with a controlled device, the top cover covering the bottom seat, the top cover and the bottom seat forming an accommodating cavity for accommodating the main control circuit board, the top cover having a clearance hole at a top of the top cover;
a first button switch, at least a portion of which is accommodated in the accommodating cavity, the first button switch being electrically connected to the main control circuit board, the first button switch being provided on the mounting base and configured to control at least one or a combination of turn-on, turn-off, temperature, wind speed, timing and power of the controlled device, wherein the first button switch comprises a button base, the button base being movably arranged and exposed from the mounting base, the button base penetrating the clearance hole; and
a display screen provided on the mounting base, the display screen being electrically connected to the main control circuit board and configured to display an operating state of the controlled device, and the main control circuit board, the first button switch and the display screen being all arranged on the top cover.

2. The foot-operated control switch according to claim 1, further comprising:
a second button switch electrically connected to the main control circuit board, the second button switch being provided on the mounting base and configured to control at least one or a combination of the turn-on, the turn-off, the temperature, the wind speed, the timing and the power of the controlled device.

3. The foot-operated control switch according to claim 1, wherein the first button switch further comprises:
a button protective cover sleeved on the button base, the button protective cover being a structure made of a silicone or rubber material.

4. The foot-operated control switch according to claim 3, wherein a plurality of anti-slip protrusions are provided on the top of the button protective cover, and the plurality of anti-slip protrusions are arranged at intervals.

5. The foot-operated control switch according to claim 1, wherein an engagement groove and a complementary engagement protrusion are provided on one and an other of the bottom seat and the top cover, and the engagement protrusion fits with the engagement groove to connect the bottom seat and the top cover together.

6. The foot-operated control switch according to claim 1, wherein a positioning groove and a positioning protrusion are provided on one and an other of the bottom seat and the top cover, and the positioning protrusion fits with the positioning groove.

7. The foot-operated control switch according to claim 1, further comprising:
a temperature sensor electrically connected to the main control circuit board, wherein the temperature sensor is located outside the mounting base and configured to measure an ambient temperature of the controlled device; and
the main control circuit board is further configured to control the display screen to display the ambient temperature of the controlled device based on first feedback information of the temperature sensor, in order to visualize a real-time ambient temperature of the controlled device, and the main control circuit board is further configured to control the controlled device to be turned off based on second feedback information of the temperature sensor.

8. A space heater, comprising a foot-operated control switch;
the foot-operated control switch comprising:
a mounting base comprising a top cover and a bottom seat, a main control circuit board being arranged on a top surface of the bottom seat and configured for electrical connection with the space heater, the top cover covering the bottom seat, the top cover and the bottom seat forming an accommodating cavity for accommodating the main control circuit board, the top cover having a clearance hole at a top of the top cover;
a first button switch, at least a portion of which is accommodated in the accommodating cavity, the first button switch being electrically connected to the main control circuit board, the first button switch being provided on the mounting base and configured to control at least one or a combination of turn-on, turn-off, temperature, wind speed, timing and power of the space heater, wherein the first button switch comprises a button base, the button base being movably arranged and exposed from the mounting base, the button base penetrating the clearance hole; and a display screen provided on the mounting base, the display screen being electrically connected to the main control circuit board and configured to display an operating state of the space heater, and the main control circuit board, the first button switch and the display screen being all arranged on the top cover.

\* \* \* \* \*